United States Patent
Pettersson

Patent Number: 5,815,821
Date of Patent: Sep. 29, 1998

[54] METHOD AND A DEVICE FOR CONSERVING POWER IN A BATTERY POWERED TRANSCEIVER

[75] Inventor: Mats G. Pettersson, Lund, Sweden

[73] Assignee: Telefonaktiebolaget LM Ericsson, Stockholm, Sweden

[21] Appl. No.: 969,461

[22] Filed: Nov. 13, 1997

Related U.S. Application Data

[63] Continuation of Ser. No. 371,392, Jan. 11, 1995, abandoned.

[30] Foreign Application Priority Data

Jan. 12, 1994 [SE] Sweden .................................. 9400054

[51] Int. Cl.$^6$ ..................................................... H04B 1/38
[52] U.S. Cl. .......................... 455/575; 455/38.3; 455/343
[58] Field of Search .................................. 455/38.3, 67.7, 455/76, 84, 88, 127, 226.2, 226.3, 296, 343, 575, 126; 327/544, 545, 546; 330/129

[56] References Cited

U.S. PATENT DOCUMENTS

| | | | |
|---|---|---|---|
| 4,631,496 | 12/1986 | Borras et al. | 455/76 |
| 4,897,560 | 1/1990 | Saito et al. | 327/544 |
| 5,001,776 | 3/1991 | Clark | 455/343 |
| 5,179,724 | 1/1993 | Lindoff | 455/76 |

FOREIGN PATENT DOCUMENTS 2 250 402  3/1992  United Kingdom.

Primary Examiner—Jacques H. Louis-Jacques
Assistant Examiner—Gertrude Arthur
Attorney, Agent, or Firm—Burns, Doane, Swecker & Mathis, L.L.P.

[57] ABSTRACT

A method and a device for conserving power in a battery powered transceiver, the transceiver comprising a transmitter (10) and a receiver (11) having receiving circuits including an input high frequency stage (12), a first mixer (13), and a first local oscillator (14). A transmit control signal is obtained when a transmitter of the transceiver is transmitting, the receiving circuits are biased to full operating level as a response to the transmit control signal, and a bias control signal is generated as a function of the transmit control signal and of a received signal strength indicating signal. At least one of the receiving circuits is then biased to a second level controlled by the bias control signal the receiving circuits comprises at least one transistor ($T_1;T_2$) and a biasing resistor network. A central unit (21) is operatively connected to the resistor network of at least one of the receiving circuits for controlling the biasing level of the transistor ($T_1;T_2$).

20 Claims, 2 Drawing Sheets

METHOD AND A DEVICE FOR CONSERVING POWER IN A BATTERY POWERED TRANSCEIVER

This application is a continuation, of application Ser. No. 08/371,392, filed Jan. 11,1995, now abandoned.

BACKGROUND

The present invention relates to a method and a device in battery powered transceivers such as cellular telephones. In such devices the electrical power consumption is an essential design feature. A cellular telephone is designed to have two basic modes of operation. In a first mode the telephone is in a standby mode in which radio signals are received in a passive way. In the second mode of operation the telephone is transmitting and receiving radio signals simultaneously using a common antenna system.

A cellular telephone should preferably be operative during a long time period, at least in the standby mode. As such telephones are battery powered the capacity of the battery has to be very high. Unfortunately a high capacity of a battery normally corresponds to a high weight of the battery. Normally, the weight of the battery is a substantial portion of the total weight of the telephone.

It is well-known in the relevant technical field that the electrical power consumption of the telephone can be reduced by periodically disconnecting the receiver from the battery during predetermined time periods. This type of battery saving systems normally disconnect the receiver from the battery during a number of milliseconds. Then the receiver is again connected to the battery during a number of milliseconds, the receiver during the latter period being capable of monitoring a control channel or receiving an incoming call.

A further method of conserving power in handheld mobile telephones during a receiving mode of operation is disclosed in U.S. Pat. No. 5,179,724. According to this method the telephone having receiving means and transmitting means is operated in different ways depending on the mode of operation. In a first mode, that is when the transmitting means is transmitting, an amplifier of the receiving means is biased to a relatively high level. In a second mode, that is when the transmitting means is not transmitting, the level of the received signal is sensed and when the signal is relatively strong the amplifier is biased to a relatively low level.

The amplifier of the receiving means in a cellular telephone normally consumes less than 20% of the total power of the receiving means. Furthermore, the conditionally high level input signal required to allow a lower biasing of the amplifier will highly restrict the time periods during which the amplifier may be turned off or biased to a significantly lower level.

Summary

An object of the present invention is to reduce the electrical power consumption of a battery powered transceiver for instance in a cellular telephone. An essential factor in accomplishing said object is a consideration of the specification of cellular telephones. Receiver parameters that are considered according to the invention are the adjacent channel selectivity, intermodulation and the spurious response. By further analyzing these parameters and the requirements thereon according to different mobile telephone systems a second and improved way of conserving has been revealed. In many commercially available cellular telephone systems the above-mentioned parameters should be fulfilled only when the transceiver is in the transmitting mode. In other cellular telephone systems parameters such as adjacent channel selectivity, intermodulation, and spurios response are specified and have to be fulfilled only when the received signal strength is very low. Thus, without departing from the specifications set in the telecommunication systems it would be possible to allow some degree of lower performance in these aspects. In this way a substantial reduction of the power demands of the transceiver can be achieved.

According to the invention the power consumption can be conserved in a battery powered transceiver comprising a transmitter and a receiver having as receiving circuits an input high frequency stage, a first mixer, and a first local oscillator. A transmit control signal is obtained when the transmitter is actually transmitting, and the strength of a received signal is also obtained. The strength of the received signal is referred to as the received signal strength indicating signal or RSSI signal. The receiving circuits are biased to full operating level as a response to said transmit control signal, that is when the transmitter is actually transmitting. Then a bias control signal is generated as a function of said transmit control signal and said strength of the received signal. For systems according to which specifications on the receiver are set in transmit mode only and no other conditions are specified said RSSI signal can be weighted to zero when said bias control signal is generated. Selected elements of said receiving circuits are biased to other levels which are controlled by said bias control signal. Said other levels are lower than said full operating level. Different levels are applicable in different elements of the receiving circuits.

BRIEF DESCRIPTION OF DRAWINGS

Preferred embodiments of the invention will be described in more detail below, reference being made to the accompanying drawings, in which.

DETAILED DESCRIPTION

Figure 1:
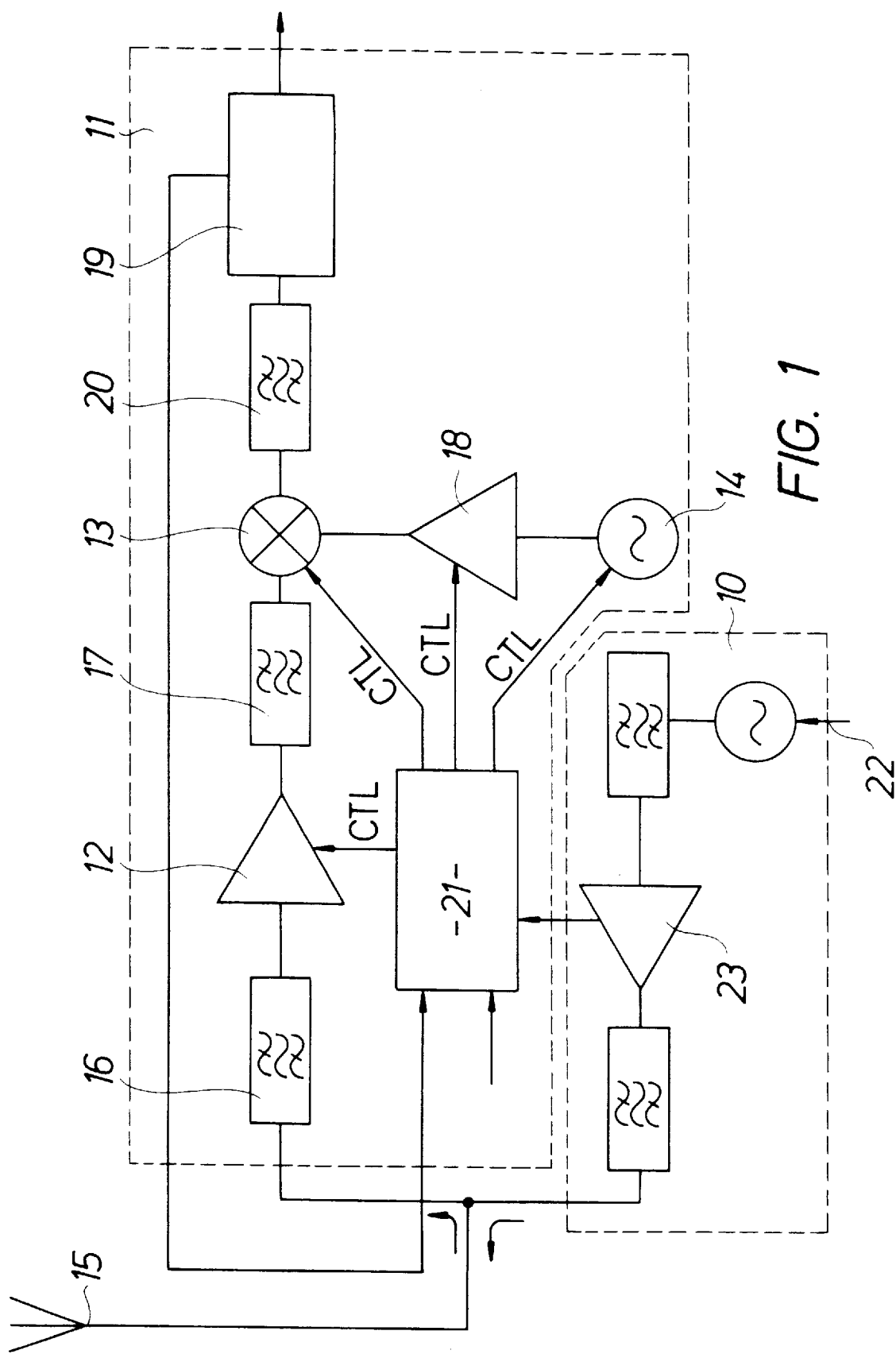
FIG. 1 is a schematic block diagram illustrating a transceiver operating according to the invention.

The transceiver shown in FIG. 1 includes a transmitter 10 and a receiver 11. The receiver 11 includes a plurality of receiving circuits such as an input high frequency stage 12, a first mixer 13, and a first local oscillator 14. Said transmitter 10 and said receiver 11 are operatively connected to a common antenna 15. The high frequency stage 12 is connected to said antenna 15 through a first band pass filter 16 to the antenna and through a second bandpass filter 17 to said first mixer 13. Said first local oscillator 14 is connected to said first mixer 13 through a buffer 18 and an output of said first mixer 13 is connected to an intermediate frequency stage 19 through a third bandpass filter 20.

According to the embodiment shown in FIG. 1 a received signal strength indicating signal is generated in said intermediate frequency stage 19. Said indicating signal is fed to a central unit 21. In other embodiments not shown said indicating signal is generated in other appropriate circuits or elements of the receiver.

The transmitter 10 includes a modulating input 22 which is operatively connected to a power amplifier 23 in turn being operatively connected to said antenna 15. Said power amplifier 23 is operatively connected to said central unit 21 to indicate whenever the power amplifier is active and the transmitter is transmitting.

According to a preferred embodiment of the invention said central unit 21 is operatively connected to said input high frequency stage 12, or front end stage, to said first mixer 13, to said buffer 18, and to said first local oscillator 14 for controlling the biasing of the receiving circuits included therein. Biasing of the circuits should in this context be read as the adjustment of an operating or working point of an electric device such as a transistor. A biasing level corresponds to a specific operating current. In other embodiments said central unit 21 is replaced by other hardware or software elements. In a hardware embodiment said bias control signal is generated by hardware in response to said RSSI signal and said transmit control signal.

Figure 2:
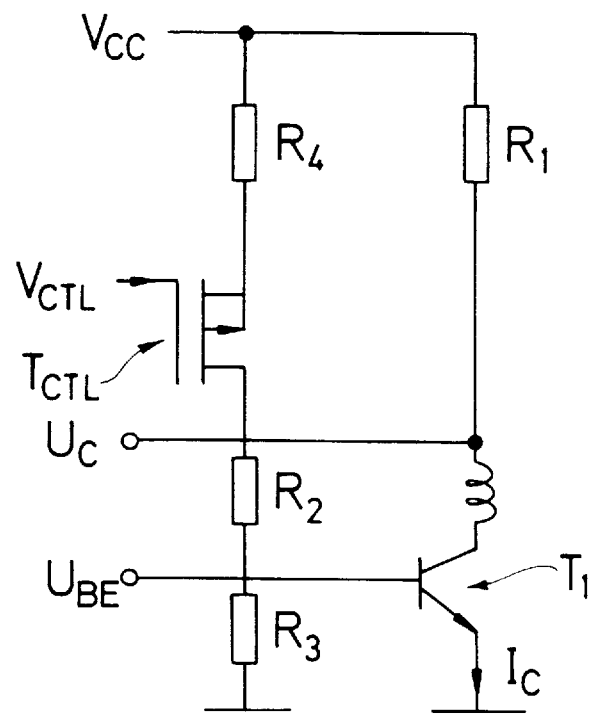
FIG. 2 shows a biasing circuit used for conserving power according to the invention.

FIG. 2 shows a preferred embodiment of a circuit, the operating point whereof being controlled by a bias control signal generated in said central unit 21. The circuit of FIG. 2 is a conventional transistor circuit including a transistor T1. In the biasing circuit including resistors $R_2$, $R_3$, and $R_4$ a second transistor $T_{ctl}$ is included. In the embodiment shown in FIG. 2 said transistor $T_1$ is a conventional bipolar transistor and said transistor $T_{ctl}$ is a unipolar transistor or a field-effect transistor (FET). The level of a control voltage $V_{ctl}$ generated in said central unit 21 will affect or control the biasing current or operating point of said transistor $T_1$. In other embodiments not shown said transistor $T_1$ is exchanged to a transistor of any type such as a field-effect transistor. With respect to the working point of the circuit shown in FIG. 2 the following equations apply:

$U_C$ constant $I_C = (V_{CC} - U_C)/R_{tot} - I_{R3}$, where $R_{tot} = R1$ if no $V_{ctl}$ is applied $R_{tot} = R_1/R_4$ if $V_{ctl}$ is applied (transmit mode)

$I_C$ is increased by factor $(R_1+R_4)/R_4$ in transmitting mode, assuming $I_{R3} \ll I_C$.

Figure 3:
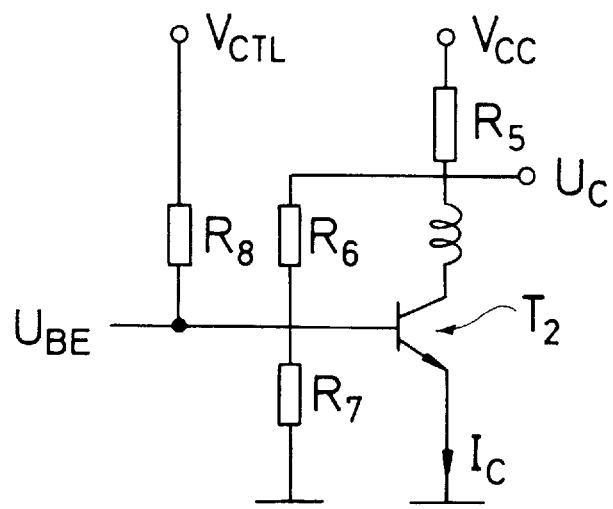
FIG. 3 shows an alternative biasing circuit for conserving power according to the invention.

FIG. 3 shows an alternative embodiment of a bias controlled circuit. The following equations apply:

$I_{R7}$ is assumed to be constant $I_{R7} = U_{BR}/R_7$ $U_C = U_{BE} + I_{R6} \times R_6$ $I_{R6} = I_{R7} - I_{R8}$ $I_{R8} = (V_{ctl} - U_{BE})/R_8$ $I_C = (V_{cc} - U_C)/R_5 - I_{R7} = V_{cc}/R_5 - I_{R7} -$
$\quad U_{BE}/R_5 - I_{R7} \times R_6/R_5 + I_{R8} \times R_6/R_5 =$
$\quad V_{cc}/R_5 - I_{R7} - U_{BE}/R_5 - I_{R7} \times R_6/R_5 +$
$\quad (V_{ctl} \times R_6)/(R_5 \times R_8) - U_{BE}R_2/(R_5 \times R_8)$ $I_C(V_{ctl}=0) = V_{cc}/R_5 - I_{R7} - U_{BE}/R_5 - I_{R7} \times R_6/R_5 - (U_{BE} \times R_2)/(R_5 \times R_8)$ $I_C(V_{ctl} \neq 0) = I_C(V_{ctl}=0) + (V_{ctl} \times R_6)/(R_5 \times R_8)$ In this embodiment no switch transistor is required. Instead the temperature stability is somewhat decreased due to the externally inserted biased current. The voltage across the stabilization resistor $R_5$ also changes.

The operation of the system according to the invention is as follows. In a first mode of operation, a transmitting mode, the central unit 21 obtains a transmit control signal when the transmitter 10 is transmitting. In the embodiment shown in FIG. 1 this is accomplished by sensing the status of the power amplifier 23 of the transmitter. In other embodiments a further central unit controlling the transmitter 10 will transfer said transmit controlled signal to said first central unit 21. In this first mode of operation all circuits in the receiver are biased to full operating level and all parameters specified in the cellular telephone system are fulfilled. This is a conventional mode of operation of a cellular telephone.

In a second mode of operation, that is a standby or idle mode, no transmit control signal is received or obtained by said central unit 21. In a preferred embodiment said central unit generates a bias control signal that adjusts the working point or biasing level of the input high frequency stage 12, the first mixer 13, the first local oscillator 14, and the buffer 18. The operating current levels of the circuits are decreased, in the input high frequency stage 12 by 60%, in said first mixer 13 by 60%, in said first local oscillator 14 by 45%, and in said buffer 18 of the local oscillator by 60%. In this way approximately 35% of the total operating current of the receiver can be conserved in the second mode of operation. Also other levels of biasing can be used according to the invention. When appropriate all circuits are biased to the same level, for instance 40%. In the preferred embodiment a weight factor is introduced in the central unit to decrease the influence of the received signal strength indicating signal. Thus, the bias control signal includes a factor that will make the adjustment of the biasing level less dependent on or independent of the received signal strength indicating signal.

In some cellular telephone systems parameters such as adjacent channel selectivity, intermodulation, and spurios response are specified and have to be fulfilled only when the received signal strength is very low. When using the method according to the invention in such systems the received signal strength indicating signal is used by the central unit 21 for adjusting the biasing level of the receiving circuits. At sufficiently high levels of the received signal strength the influence thereof on the adjustment level of the biasing is very low, that is the current of the receiving circuits are reduced to the lowest possible value. A lower value of the received signal strength will decrease the adjustment level of the biasing current and finally at a very low level of the received signal strength no adjustment is made on the biasing current. In this way any specification requirements can be met.

Within the scope of the invention it is possible also to adjust the biasing level of selected circuits only and also to observe adjust different circuits to different levels. When determining the adjusting levels care should be taken to the above mentioned parameters. Also other circuits may be included and controlled or implemented differently without departing from the scope of the claimed invention. All embodiments shown in the drawings are to be considered as illustrative examples only.

What is claimed is:

1. A method of conserving power in a battery powered transceiver, said transceiver comprising a transmitter and a receiver having receiving circuits including an input high frequency stage, a first mixer, and a first local oscillator, said receiver fulfilling requirements placed upon receiver parameters as set out in specifications of a telecommunication system in which said transceiver is used, said method including the steps of obtaining a transmit control signal, when a transmitter of said transceiver is transmitting, and biasing said receiving circuits to full operating level as a response to said transmit control signal, wherein the biasing step includes the steps of generating a bias control signal as a function of said transmit control signal and of a received signal strength indicating signal, said indicating signal being weighted so as to reduce its influence upon said bias control signal, when said requirements so permit, and biasing at least two of said receiving circuits to respective levels lower than said full operating level and controlled by said bias control signal, the respective values of said lower levels being set independently of each other and in accordance with said requirements to minimize said lower levels, while conforming to said requirements.

2. A method according to claim 1, wherein said bias control signal is decreased to increase the respective biasing levels of said receiving circuits, when said signal strength indicating signal decreases.

3. A method according to claim 1, wherein said respective biasing levels are each decreased by at least 30%.

4. A device for conserving power in a battery powered transceiver, said transceiver comprising a transmitter and a receiver having as receiving circuits an input high frequency stage, a first mixer, and a first local oscillator, comprising a central unit for obtaining a transmit control signal when a transmitter of said transceiver is transmitting, each of said receiving circuits comprising at least one transistor and a biasing resistor network, wherein said central unit contains hardware or software logic for generating a bias control signal as a function of said transmit control signal and of a received signal strength indicating signal, and said central unit is operatively connected to said resistor network of at least two of said receiving circuits for controlling the biasing of said transistors to respective levels lower than said full operating level, the respective values of said lower levels being set independently of each other by means of said bias control signal.

5. A device according to claim 4, wherein said central unit is operatively connected to a control transistor included in said resistor network, said control transistor supplying biasing current to said transistor.

6. A method for biasing at least two components in a transceiver comprising the steps of:

receiving a signal at said transceiver;

determining a received signal strength of said received signal;

selectively weighting a bias control signal based upon a magnitude of said received signal strength and system specifications; and biasing said at least two components in said transceiver using said weighted bias control signal;

wherein each of the at least two components is biased to either of a first level and a second level, and the respective second levels of the at least two components are different.

7. The method of claim 6, wherein said step of weighting further comprises the step of:

weighting said bias control signal such that as said received signal strength increases, said biasing of said at least two components decreases.

8. The method of claim 6, wherein at least one component of the at least two components is a buffer.

9. The method of claim 6, wherein at least one component of the at least two components is an oscillator.

10. The method of claim 6, wherein at least one component of the at least two components is a mixer.

11. The method of claim 6, wherein said first level is a full operating level.

12. The method of claim 6, wherein said system specifications include at least one of: adjacent channel selectivity, intermodulation and spurious response.

13. A transceiver comprising:

means for receiving a signal at said transceiver;

means for determining a received signal strength of said received signal;

means for selectively weighting a bias control signal based upon said received signal strength and system specifications; and means for biasing at least two components in said transceiver using said weighted bias control signal wherein the biasing means biases each of the at least two components to either of a first bias level and a second bias level and the respective second bias levels of the at least two components are different.

14. The transceiver of claim 13, wherein said means for weighting also weights said bias control signal such that as said received signal strength increases, said biasing of at least one component of the at least two components decreases.

15. The transceiver of claim 13, wherein at least one component of the at least two components is a buffer.

16. The transceiver of claim 13, wherein at least one component of the at least two components is an oscillator.

17. The transceiver of claim 13, wherein at least one component of the at least two components is a mixer.

18. The transceiver of claim 13, wherein said first bias level is a full operating level.

19. The transceiver of claim 13, wherein the weighting means weights said bias signal differently for each of said at least two components.

20. The transceiver of claim 13, wherein said system specifications include at least one of: adjacent channel selectivity, intermodulation and spurious response.

* * * * *